United States Patent [19]

Müller et al.

[11] 4,423,974
[45] Jan. 3, 1984

[54] DRIVE COUPLING FOR RIBBON MECHANISM IN TYPEWRITERS AND SIMILAR MACHINES

[75] Inventors: Siegfried Müller, Frankfurt; Friedrich Teichmann, Feucht, both of Fed. Rep. of Germany

[73] Assignee: Triumph-Adler A.G. fur Buro- und Informationstechnik, Nuremburg, Fed. Rep. of Germany

[21] Appl. No.: 327,943

[22] Filed: Dec. 7, 1981

[30] Foreign Application Priority Data

May 12, 1981 [DE] Fed. Rep. of Germany ... 8113901[U]

[51] Int. Cl.³ .................................................. B41J 35/00
[52] U.S. Cl. ..................................... 400/242; 400/196; 400/196.1; 400/208; 400/235.1; 400/236
[58] Field of Search ............ 400/194, 195, 196, 196.1, 400/207, 208, 208.1, 236, 229, 242, 243, 235.1; 403/1, 109, 263, 298, 300, 305, 309, 310, 311, 348, 359, 361, 364, 345, 375, 377

[56] References Cited

U.S. PATENT DOCUMENTS

| 946,359 | 1/1910 | Hess | 400/242 X |
|---|---|---|---|
| 2,349,483 | 5/1944 | Willheim | 400/242 X |
| 3,219,373 | 11/1965 | Sutliff | 403/348 X |
| 3,346,090 | 10/1967 | Goff, Jr. et al. | 400/208 |
| 4,231,667 | 11/1980 | Behrendt et al. | 400/208 |

Primary Examiner—Ernest T. Wright, Jr.
Attorney, Agent, or Firm—Joseph R. Spalla

[57] ABSTRACT

An engage/disengage coupling between a drive and driven part for imparting rotational force without axial force components.

2 Claims, 1 Drawing Figure

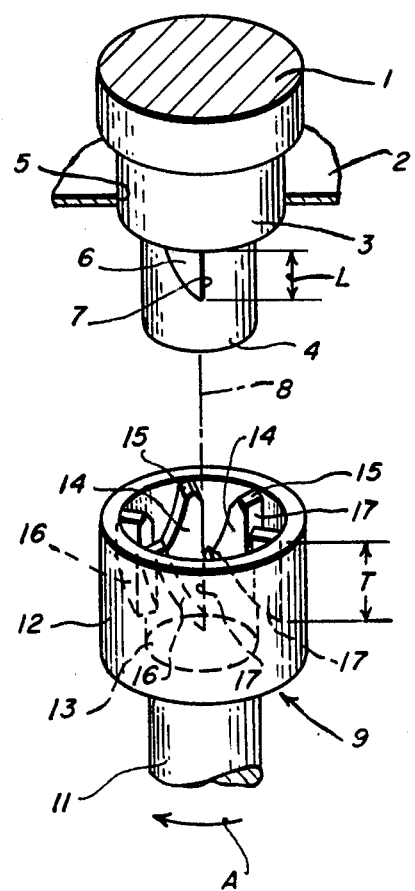

DRIVE COUPLING FOR RIBBON MECHANISM IN TYPEWRITERS AND SIMILAR MACHINES

This invention relates to a coupling for transmitting driving force to feed ribbon in typewriters or similar machines.

Ribbons for such machines are either wound on spools mountable in the typewriter or they are supported in ribbon cassettes which are inserted into the typewriter or similar machine. Various types of ribbon cassettes are known. For instance, the ribbon in the cassette can be unwound from a supply spool and wound on a driven take up spool or tracked between a driving wheel and a counterwheel for its transport across a printing area.

In every case, either a ribbon spool or the shaft of a driven wheel in a ribbon cassette must be coupled to a drive on the machine. Among known couplings, one is comprised of a shaft projecting out of the casseete which is formed with a radially extending wedge shaped projection adapted, when the cassette is inserted, to engage and to be driven by drive surfaces formed by recesses in a coupling part in the machine. As the ribbon drive in the machine operates, the coupling part incrementally drives the shaft through the projection thereon whereby the ribbon is transported.

The known projections are often of triangular wedge shape to enable easier driving engagement into one of the complementary recesses of the coupling part on the machine. The complementary wedge shaped driving projections and recesses have a significant disadvantage in that if, for whatever reason, the spool or the drive wheel associated with the driven shaft is suddenly harder to turn, the shape of the angular off-vertical drive surfaces of the coupling part and the triangular projection will result in an axial component of force acting on the drive wheel which will further impede the ribbon transport. In the extreme case, this axial component of force may even lead to the spool or the drive wheel disposed in a cassette, being pushed against the cassette cover. Proper ribbon transport is then no longer possible. A similar situation can develop when the spool is mounted directly on the ribbon drive mechanism of a typewriter. There too, any axial movement of the spool may bring it into interfering contact with other parts, for example, coiled ribbon diameter sensors, further impeding proper ribbon transport.

An arrangement in accordance with the invention allows easy insertion of a spool or cassette in the provision of a driving shaft having a projection whose shape is complimentary to that of recesses in a coupling part, as in the prior art. However, in accordance with the invention, the projection and drive surfaces of the recesses have facing surfaces which are parallel to the longitudinal center line of the coupling, with the result that there is no axially component of force. Consequently, the spool or the drive shaft is not urged or moved axially during application of rotational driving force.

It is an object of the invention to provide an engage/disengage drive coupling for a ribbon transport mechanism which prevents the above described disadvantages from occurring.

Other objects, features and advantages of the present invention will become known to those skilled in the art from a reading of the following detailed description when taken in conjunction with the accompanying drawing wherein:

The single FIGURE is an exploded perspective view showing an embodiment of the invention.

There is shown in the FIGURE a core 1 which is rotatably supported in a cassette whose bottom wall 2 only is shown. The core 1 might represent a spool core in the cassette or a drive wheel within the cassette for interaction with a counterwheel (not shown). In addition, the invention might be embodied on spool cores directly insertable into a complimentary coupling part in a typewriter.

Integral with and axially adjoining the core 1 is a bearing 3 and a driven shaft 4 which also serves as a pilot. The bearing 3 serves the purpose of rotatably mounting the core 1 in a bearing hole 5 in the bottom wall 2 of the ribbon cassette. A similar bearing might be provided on the opposite end of the core 1 penetrating the cover (not shown) of the ribbon cassette. A tooth shaped driving projection 6 extends radially of the driver shaft 4 and has a vertical side 7 parallel to the longitudinal center line 8 of the core 1.

A coupling part generally designated by reference numeral 9 consists of a drive shaft 11 which is suitably assembled to and for rotation by ribbon drive mechanism in the machine which may comprise means (not shown) in the form of a pawl and ratchet wheel, a stepping motor, or a cam for effecting incremental rotation in direction A.

The couping part 9 at the upper end of the shaft 11 has a cup shaped 12 whose central recess 13 is circumferentially bounded by axially extending teeth 14 the upper ends 15 of which are bevelled. The valleys or recesses 16 between the axially extending teeth 14, generally take the shape of a right triangle, which is complementary in shape to the tooth shaped projection 6 on driven shaft 4 so that when the toothed shaped projection 6 is received within one of the recesses 16 the vertical side 7 will be in direct contact with a parallel vertical side 17 of a tooth 14.

When a ribbon cassette is to be mounted, the shaft 4 depending therefrom is piloted into the central recess 13 of the coupling part 9 while its tooth shaped projection 6 is received readily into one of the recesses 16 of the coupling part 9 due to the complementary triangular shapes thereof, and as aided by the beveled upper ends 15. The length L of the toothed shaped projection 6 is expediently somewhat shorter than the depth T of the recesses 16 in the coupling part 9. When the coupling part 9 is driven in arrow direction A by a ribbon drive mechanism, the core 1 is rotated by engagement of the tooth shaped projection 6 by one of the vertical surfaces 17 of a tooth 14. Thus the vertical surface 7 of the tooth shaped projection 6 is rotatably driven by the entire contacting surface 17 of the coupling part 9. As a result there are no axial components of force associated with the rotation.

The invention claimed is:

1. An engage/disengage coupling having a rotatable driving and a rotatable drivien part,
    said driving part having a central recess circumferentially bounded by a plurality of axially extending teeth defining between them substantially triangular recesses,
    said driven part having an axially extending pilot shaft for reception into said central recess of said driving part, and a single projection extending radially from said pilot shaft defining a substantially triangular tooth plugable into any of said triangular recesses, said teeth on said driving part and said tooth on said driven part opposing drive and driven surfaces parallel to the axes of said driving and driven parts.

2. A coupling as recited in claim 1, wherein the axial length of said projection is shorter than the axial depth of said triangular recesses.

* * * * *

UNITED STATES PATENT AND TRADEMARK OFFICE
CERTIFICATE OF CORRECTION

PATENT NO. : 4,423,974
DATED : January 3, 1984
INVENTOR(S) : Siegfried Muller, et al It is certified that error appears in the above-identified patent and that said Letters Patent are hereby corrected as shown below:

Col. 1, line 20 "casseete" should be cassette

Claim 1, line 2, "drivien" should be driven

Claim 1, line 14, "having" should be inserted before opposing

Signed and Sealed this

Sixth Day of March 1984

[SEAL]

Attest:

Attesting Officer

GERALD J. MOSSINGHOFF

Commissioner of Patents and Trademarks